United States Patent
Kilian

(10) Patent No.: US 10,530,424 B2
(45) Date of Patent: Jan. 7, 2020

(54) ANTENNA DEVICE FOR SHORT-RANGE APPLICATIONS AND USE OF AN ANTENNA DEVICE OF THIS TYPE

(71) Applicant: Dieter Kilian, Olching (DE)

(72) Inventor: Dieter Kilian, Olching (DE)

(*) Notice: Subject to any disclaimer, the term of this patent is extended or adjusted under 35 U.S.C. 154(b) by 205 days.

(21) Appl. No.: 15/516,533

(22) PCT Filed: Oct. 19, 2015

(86) PCT No.: PCT/EP2015/002063
§ 371 (c)(1),
(2) Date: Apr. 3, 2017

(87) PCT Pub. No.: WO2016/062391
PCT Pub. Date: Apr. 28, 2016

(65) Prior Publication Data
US 2018/0241433 A1    Aug. 23, 2018

(30) Foreign Application Priority Data
Oct. 23, 2014   (DE) .................. 10 2014 015 708

(51) Int. Cl.
*H01Q 9/16* (2006.01)
*H04B 5/00* (2006.01)
*H01Q 11/16* (2006.01)

(52) U.S. Cl.
CPC ............ *H04B 5/0025* (2013.01); *H01Q 9/16* (2013.01); *H01Q 11/16* (2013.01);
(Continued)

(58) Field of Classification Search
CPC ................................. H01Q 9/16; H01Q 11/16
See application file for complete search history.

(56) References Cited

U.S. PATENT DOCUMENTS

| 7,151,497 B2 * | 12/2006 | Crystal .................. H01Q 1/36 343/747 |
| 8,059,045 B1 | 11/2011 | Schaffner et al. |

(Continued)

FOREIGN PATENT DOCUMENTS

| DE | 3514709 A1 | 10/1986 |
| DE | 102013016116 A1 | 3/2015 |
| GB | 2106357 A | 4/1983 |

OTHER PUBLICATIONS

International Search Report & Written Opinion issued in corresponding PCT Application No. PCT/EP2015/002063 dated Jan. 22, 2016, 13 pages.

(Continued)

*Primary Examiner* — Graham P Smith
(74) *Attorney, Agent, or Firm* — Pearne & Gordon LLP

(57) ABSTRACT

The invention relates to an antenna device (10) for short-range applications, e.g., RFID, comprising: a bipolar coaxial conductor structure (12) with an internal conductor (14) and an external conductor (16); an antenna signal terminal (22, 24) at a first end of the coaxial conductor structure (12) which is formed by a terminal contact (22) on the internal conductor (14) and a terminal contact (24) on the external conductor (16) to feed in an antenna transmitted signal and feed out an antenna received signal; a terminating impedance (Zterm) at a second end of the coaxial conductor structure (12), which is formed by a dipole (Z) connected to the internal conductor (14) at a terminal contact (28) and to the external conductor (16) at a terminal contact (30), wherein the dipole (Z) comprises at least one capacitor (C) and/or at least one inductance (L), such that when transmitting, a HF alternating current propagating through the internal conductor (14) and reaching the second end of the coaxial conductor structure (12) is coupled with the outside of the external conductor (16) at the second end of the (Continued)

coaxial conductor structure (12). The device (10) according to the invention advantageously has a relatively simple construction, with which a relatively wideband electomagnetic transmission (transmitting and/or receiving) of energy and/or information can be carried out advantageously.

17 Claims, 10 Drawing Sheets

(52) U.S. Cl.
CPC ......... *H04B 5/0062* (2013.01); *H04B 5/0012* (2013.01); *H04B 5/0037* (2013.01)

(56) References Cited

U.S. PATENT DOCUMENTS

| | | |
|---|---|---|
| 2005/0040991 A1 | 2/2005 | Crystal |
| 2005/0258842 A1 | 11/2005 | Maloney |
| 2010/0303531 A1 | 12/2010 | Fessler |

OTHER PUBLICATIONS

"The HA-VIS LOCFIELD® RFID antenna allows to design own tailored UHF RFID reading zone," retrieved on Mar. 14, 2014. http://www.harting.com/en/news/product-news/detail/article/design-your-own-uhf-rfid-reading-zone-002724/.
Office action issued in corresponding German Patent Application No. 10 2014 015 708.3 dated May 13, 2015, 8 pages.

\* cited by examiner

ANTENNA DEVICE FOR SHORT-RANGE APPLICATIONS AND USE OF AN ANTENNA DEVICE OF THIS TYPE

The present invention relates to the field of high-frequency technology, in particular to an antenna device for short-range applications such as RFID applications, and the use of such an antenna device.

For the purposes of the invention, the term "short-range applications" particularly comprises applications in which the transmission of electromagnetic energy and/or electromagnetic signals is intended over distances of less than 5 m, particularly less than 1 m. However, the distance is preferably greater than 0.01 m, particularly greater than 0.05 m.

It is an object of the present invention to create a simple way to transmit energy and/or information simply and wirelessly, particularly over short distances.

This object is solved according to the invention with an antenna device for short-range applications, in particular RFID applications, comprising:
- an elongated bipolar coaxial conductor structure with an internal conductor and an external conductor which surrounds the internal conductor coaxially,
- an antenna signal terminal at a first end of the coaxial conductor structure which is formed by a terminal contact on the internal conductor and a terminal contact on the external conductor to feed in an antenna transmitted signal and feed out an antenna received signal,
- a terminating impedance at a second end of the coaxial conductor structure which is formed by a dipole connected to a terminal contact on the internal conductor and a terminal contact on the external conductor, wherein the dipole comprises at least one capacitor and/or at least one inductance in such manner that
- when transmitting, a HF alternating current propagating through the internal conductor and reaching the second end of the coaxial conductor structure is coupled with the outside of the external conductor at the second end of the coaxial conductor structure by means of the terminating impedance to generate a HF alternating current that originates from the second end of the coaxial conductor structure and propagates via the external conductor on the outside of the external conductor, and that
- when receiving, a HF alternating current propagating through the external conductor, flowing on the outside of the external conductor and reaching the second end of the coaxial conductor structure is coupled with the internal conductor at the second end of the coaxial conductor structure by means of the terminating impedance to generate a HF alternating current that originates from the second end of the coaxial conductor structure and propagates via the internal conductor.

The antenna device according to the invention is advantageously of relatively simple construction with which it is advantageously possible to realise for example a relatively wide band electromagnetic transmission (transmitting and/or receiving) of energy and/or information, such as a communication with active or passive RFID transponders.

To this extent, the elongated bipolar coaxial conductor structure constitutes a "main component" of the antenna device, since the actual transmission and receiving operation is realised with this coaxial conductor structure, or more precisely with the outside of the external conductor of the coaxial conductor structure. When transmitting, a HF (high frequency) alternating current is generated and propagates via the external conductor, on the outside thereof, creating electromagnetic "travelling waves" on this outer surface. When receiving, a HF alternating current flowing on the outside of the external conductor is coupled with the internal conductor.

For the physical design of the "coaxial conductor structure", the related prior art may be used to advantage within the scope of the invention. In the simplest case, the coaxial conductor structure has the same design as is known from conventional bipolar coaxial cables. Such known structures or cables typically possess an internal conductor (core) with a circular cross-section for example, which is surrounded by a—for example—cylindrical external conductor (typically in the form of a metallic wire mesh for example). In a preferred embodiment of the invention, the coaxial conductor structure is flexible, as is also the case for a conventional coaxial cable, for example.

When transmitting, the "antenna signal terminal" provided at a first end of the coaxial conductor structure serves to feed an antenna transmitted signal in, and when receiving to feed an antenna received signal out. This feeding in and out at the antenna signal terminal is assured by one terminal contact on the internal conductor and one terminal contacts on the external conductor.

The antenna signal terminal that is formed by the two aforementioned terminal contacts may be connected to a transmitter, a receiver or a combination of transmitter and receiver to operate the antenna device for example via a bipolar wiring arrangement. When viewed in the longitudinal direction of the coaxial conductor structure, each of these two terminal contacts is preferably located directly on or very close to the first end (separation e.g., less than 5%, particularly less than 1% of the length of the coaxial conductor structure).

The "terminating impedance" provided on a second end of the coaxial conductor structure serves to couple the HF alternating current propagating via the internal conductor and reaching the second end with the outside of the external conductor when it reaches the second end when transmitting. When receiving, the terminating impedance serves to couple the HF alternating current propagating via the external conductor and flowing on the outside of the external conductor to the internal conductor at the second end.

The terminating impedance is formed by a dipole connected via terminal contacts to the internal conductor and the external conductor at the second end, wherein the dipole comprises at least one capacitor and/or at least one inductance.

In one embodiment, it is provided that when viewed in the longitudinal direction of the coaxial conductor structure, each of these two terminal contacts is preferably located directly on or very close to the second end (separation e.g., less than 5%, particularly less than 1% of the length of the coaxial conductor structure). In an alternative embodiment, however, only one of the two terminal contacts when viewed in the longitudinal direction of the coaxial conductor structure is located directly on or very close to the second end, while the other terminal of the dipole passes through an earthing arrangement provided directly on the dipole (connection with an "electrical earth") and through this earthing arrangement finally to a terminal contact directly on or very close to the first end.

In practice, the aforementioned "capacitors" and "inductances" may be implemented in the circuitry for example by means of corresponding (separate) "components", although in view of the relatively high frequencies ("HF") present here, such capacitors and inductances may alternatively consist entirely or partly of "conductor geometries"

designed for this purpose. For the purposes of the invention, the term "high frequency" (HF) means that the signal in question has a frequency or substantial frequency components (e.g., as carrier frequency) above 1 kHz. Preferably, even frequencies higher than 50 MHz, particularly higher than 100 MHz are provided when the antenna device is in operation.

At such relatively high frequencies, it may thus be assumed that the terminating impedance is not defined by the impedance of the dipole alone, but that the bipolar wiring arrangement, which is necessarily present for connecting said dipole to the terminal contacts on the internal conductor and the external conductor itself has a not insignificant impedance, and which when combined with the impedance of the dipole thus defines the value of the terminating impedance. For example, supply wires leading to the dipole may each have the effect of an inductance depending on their length. Furthermore, such supply wires also have a significant mutual capacitance depending on the distance separating the supply wires, which must also be included in the calculation/dimensioning in the same way as the inductance.

Accordingly, the specific design of the terminating impedance should therefore also take into account the influence of this wiring arrangement between the second end and the dipole in order to achieve the effect according to the invention to be obtained with the terminating impedance (the HF current couplings explained previously).

On the basis of its operating principle, the antenna device according to the invention may also be described as a coaxial travelling wave antenna or travelling wave conductor for the electromagnetic transmission of information and energy.

In this context, the term "travelling wave" refers to the operating mode of the device which is sought within the scope of the invention, in which electromagnetic waves run, or "travel" from the second end of the coaxial conductor structure towards the first end of the coaxial conductor structure along the structure on the outside of the external conductor when transmitting for example, and travelling waves of such kind run along the coaxial conductor structure on the outside of the external conductor when receiving (and when they reach the second are coupled with the internal conductor as HF alternating current).

The operating principle of the device when transmitting, i.e. when the high-frequency antenna transmitted signal is fed in at the antenna signal terminal of the first end of the coaxial conductor structure, may be described as follows: The antenna transmitted signal which is created between the terminal contacts on the internal conductor and the external conductor, and accordingly fed in, is in principle transmitted in a conventional coaxial conductor along the bipolar coaxial conductor structure to the second end thereof. The discontinuity of the coaxial conductor structure arising from the second end, or by the terminating impedance provided there, in conjunction with a suitable design of said terminating impedance in order to bring about the aforementioned HF current couplings, causes the electromagnetic travelling waves to return towards the first end of the coaxial conductor structure along the coaxial conductor structure as surface waves (on the outside of the external conductor). A more specific description of the basic idea according to the invention and how it differs from the prior art is provided at the end of this description, again based on a comparison example with reference to FIGS. 26 and 27.

In this context, it is advantageous for many applications if when transmitting the coaxial conductor structure creates an electromagnetic field (travelling waves) that is concentrated about it, but only emits very little electromagnetic energy, or none at all, via "taking off" electromagnetic waves. This operating mode which is the objective of the invention may also be described as "coupled mode". It should be noted that curvatures of the coaxial conductor structure can increase the taking off of waves, so that one or more curved path sections may be provided advantageously in the coaxial conductor structure to influence the antenna properties (e.g., range).

The coaxial conductor structure may be rigid or flexible. It is also possible that both at least one rigid section and at least one flexible section are provided, from which the coaxial conductor structure is constituted. The elongated coaxial conductor structure may be e.g. at least ten times, particularly at least 100 times longer than a (maximum) transverse extension (e.g., diameter) of the coaxial conductor structure.

The elongated coaxial conductor structure may be for example at least 0.05 m, particularly at least 0.1 m long. However, particularly interesting applications are those in which this length is even greater. However, for most applications it is sufficient of this length is not longer than 200 m, particularly not longer than 100 m.

In one embodiment it is provided that this length is equal to at least 0.1, particularly at least 0.25, more particularly at least six times as long as the aforementioned operationally intended wavelength of the travelling waves on the coaxial conductor structure.

In one embodiment it is provided that this length is particularly not more than 500 times greater, more particularly not more than 300 times greater than the corresponding wavelength of the travelling waves for an operationally intended signal frequency of up to 1 GHz. For operating frequencies higher than 1 GHz, it provided according to one embodiment that this length is not more than 1000 times, particularly not more than 500 times as long as the corresponding wavelength of the travelling waves.

If, as will be explained later in this document, an "active" or "effective" length of the coaxial conductor structure is defined by the arrangement of a common mode current filter or a surface wave attenuation device, the length specifications given above must refer not to the length of the (overall) coaxial conductor structure, but instead the "active" or "effective" length thereof.

A preferred use of the antenna device is the transmission and/or receiving of a signal with a carrier frequency of more than 10 MHz, for example, particularly more than 100 MHz and/or less than 12 GHz, particularly less than 8 GHz, particularly less than 5 GHz.

In one embodiment of such a use, in particular for short-range applications such as particularly e.g., RFID applications, the device is used with an operating frequency (e.g., carrier frequency of the antenna signal in transmitting mode) in the range from 400 MHz to 6 GHz. In one embodiment, the operating frequency is in the range from e.g., 860 to 960 MHz (as is usual for many RFID applications, for example). In another embodiment, an operating frequency in the range from 1 to 3 GHz, for example about 2.4 GHz, is used.

Alternatively or in addition to transmitting information, it may be provided that the antenna device be used for energy transmission, particularly for example for the wireless (capacitive) charging of electrical energy accumulators (e.g., rechargeable batteries) in electric or electronic units (e.g., RFID tags or items equipped with RFID tags, electric or electronic devices etc.), particularly mobile or portable units (e.g., mobile phones, mobile computers such as "tablet-PCs", "smartphones" etc.).

The device may be used particularly advantageously for transmitting information and/or energy between the coaxial conductor structure and the units in question, which are located in relatively close proximity to the coaxial conductor structure. The criterion of a maximum distance between the coaxial conductor structure and the unit in question may be used for example to define the term "relatively close proximity". In this context, the term "distance" should refer to the minimum distance between the unit and any part of the coaxial conductor structure. The relatively close proximity may be defined within the scope of the use according to the invention for example by a maximum distance of not more than 5 m, particularly not more than 3 m, more particularly not more than 1 m, most particularly not more than 0.5 m. For illustrative purposes, the units are then positioned inside a notional "tube" surrounding the coaxial conductor structure and having a diameter of the size mentioned above.

The antenna device may also be used to transmit information and/or energy for wireless sensors, active or passive (RFID) transponders or the like, for example.

The internal conductor and the external conductor of the coaxial conductor structure are electrically conductive (e.g., made from a metallic material). In the simplest case, the internal conductor has a circular cross-section and the external conductor has an annular cross-section.

Cross-sectional contours other than circular cross-sectional contours are also possible for the internal conductor and/or the external conductor, for example rectangular or square shape, or oval shapes, for example.

The internal conductor may be constructed as a solid or as a hollow conductor.

In the simplest case, the cross-section of the internal conductor and/or the cross-section of the external conductor is/are uniform over the length of the coaxial conductor structure.

When viewed in the radial direction, an electrical insulation or dielectric (including air, for example) may be arranged between the internal conductor and the external conductor. An electrical insulator for example (made of plastic, for example) may be provided radially outside of the external conductor, which like the internal conductor is preferably made from a metallic material, and in the following this will be referred to as the "insulating sheath" of the coaxial conductor structure.

As was explained earlier, the terminating impedance provided at the second end of the coaxial conductor structure serves to enable coupling of HF alternating currents from the internal conductor to the outside of the external conductor when transmitting and from the outside of the external conductor to the internal conductor when receiving.

According to one embodiment, particularly with regard to the preferred "coupled mode" operating principle, the antenna device and its terminating impedance are designed such that more than 50% of an energy from an antenna transmission signal, generated by the infeed of said antenna transmission signal and arriving at the second end returns towards the first end starting from the second end as a "travelling wave bound to the coaxial conductor structure". In this case, therefore, less than 50% of the energy arriving at the second end is radiated from the coaxial conductor structure as an electromagnetic wave (or otherwise dissipated).

Alternatively or in addition thereto, the antenna device and its terminating impedance may be designed such that more than 30%, particularly more than 40% of the energy of an antenna transmitted signal fed in at the antenna signal terminal of the first end of the coaxial conductor structure runs back towards the first end starting from the second end as a travelling wave bound to the coaxial conductor structure.

In one embodiment, the "dipole" contained in the terminating impedance comprises at least one capacitor and at least one inductance.

In one embodiment, the dipole comprises at least one ohmic resistor, wherein this ohmic resistor has a resistance value less than 0.5 or more than 2 times the value of a wave resistance of the coaxial conductor structure. With this dimensioning of the resistance value, larger electrical losses due to a current flow through the resistor are advantageously avoided.

In a preferred embodiment it is provided that the terminating impedance (according to the value thereof) at least approximately corresponds to a wave resistance of the coaxial conductor structure. For this purpose in particular, a real part of the terminating impedance may lie in the range from 0.9 to 1.1 times the value of the wave resistance of the coaxial conductor structure.

In one embodiment, the dipole is in the form of a circuit arrangement on a circuit carrier (particularly a circuit carrier board, for example). This circuit arrangement may additionally comprise a bipolar wiring arrangement, which connects the dipole to the terminal contacts on the internal conductor and on the external conductor, or a portion (particular a major portion, for example) of such a wiring arrangement. The terminal contacts on the internal conductor and on the external conductor may each be realised as solder points, for example.

For the purposes of the invention, the term "circuit arrangement" describes an arrangement of discrete components (e.g., capacitors, coils, resistors etc.) and/or zones that are electrically conductive but electrically insulated from each other (e.g., conductor paths, conductive areas, through-connections etc. on a circuit carrier board), which have the effect of such "components" by virtue of their geometrical shape and positioning with respect to each other (taking into account the properties of the environment, e.g., the properties of the insulation materials and/or the "dielectics" formed thereby).

In one embodiment, a circuit arrangement provided to realise the dipole forms at least one HF-current path, which leads from the terminal contact on the internal conductor, optionally via "feed wires", further via one or more components (either discrete and/or implemented in a "conductor geometry" as explained earlier) to the terminal contact on the external conductor (Alternatively or additionally, a HF current path may also lead to an earthing arrangement connector directly on the dipole).

The circuit arrangement preferably has a relatively "compact" spatial dimension, which adjoins the second end of the coaxial conductor structure, so that any electromagnetic radiation is immediately powerfully suppressed from the area of the dipole (in the case of a "more expansive" spatial dimension of the dipole, the tendency for electromagnetic radiation to radiate out of the area of the dipole increases, which is not desirable within the scope of the invention).

The circuit arrangement is preferably designed and the antenna device is operated to transmit in such manner that a common mode current with a value as close as possible to that of the alternating current on the internal conductor is coupled to the outside of the external conductor at the second end of the coaxial conductor structure (e.g., with a value of at least 80% of that of the internal conductor current). The "compact" spatial dimension of the circuit arrangement described previously usually works strongly in favour of achieving this objective.

With regard to the physical shape and spatial dimension lent to the dipole by the circuit arrangement (including the electrical wires for connecting it, hereinafter also referred to as feed wires), according to one embodiment this spatial dimension is "lean", i.e. elongated. According to this embodiment, this dimension is thus smaller in a transverse direction than in a lengthwise direction.

In configuration variant of the above, the previously described "lengthwise direction" of the dipole (including any feed wires) is identical to the lengthwise direction of the coaxial conductor structure, and in the case of any curvature thereof it is identical with the coaxial conductor structure at the second end thereof. In other words, in this variant the dipole then extends "in continuation" of the lengthwise direction of the coaxial conductor structure.

In another configuration variant, the previously described lengthwise direction of the dipole (including any feed wires) is aligned at an angle to the lengthwise direction of the coaxial conductor structure at the second end thereof. In other words, although in this variant the dipole also extends in a "lean shape", it does not continue in the same direction as the lengthwise direction of the coaxial conductor structure, but is instead arranged "at an angle" on the second end of the coaxial conductor structure, for example.

In a preferred embodiment, the dimension of an elongated dipole (including any feed wires) in the lateral direction is less than 10 times, particularly less than 5 times the size of the lateral dimension of the external conductor at the second end of the coaxial conductor structure.

In a preferred embodiment, the dimension of the dipole (including any feed wires) is less than 3 cm, in particular less than 2 cm.

In all these embodiments which more closely specify the dimension of a dipole in the lateral direction thereof, as explained earlier the lengthwise directions of the coaxial conductor structure and of the dipole may be identical or different from each other.

In one embodiment, a common mode current filter or a surface wave attenuation device, that is to say a means that causes attenuation of the surface waves (travelling waves) and/or suppression of the common mode component of the HF current connected to the surface waves is arranged at a distance from the second end of the coaxial conductor structure when viewed in the lengthwise direction of the coaxial conductor structure. In this context, such a filter or device may be arranged at a distance from the second end of the coaxial conductor structure corresponding to at least 0.1, particularly at least 0.25, more particularly at least 6 times the wavelength of the waves travelling on the external conductor. With this selected distance, and "active" or "effective" length of the coaxial conductor structure is defined (coaxial conductor structure section from the second end to the common mode current filter or the surface wave attenuation device).

According to this embodiment, a surface wave attenuation device may be arranged on the outer circumference of the external conductor for example (e.g., surrounding an insulating sheath of the coaxial conductor structure), to attenuate the travelling waves. Such a surface wave attenuation device is advantageous in that the area in which the travelling waves return along the coaxial conductor structure as described earlier can be delimited with good definition. The attenuation device serves to absorb at least most of the energy of the returning travelling waves as they arrive. In one embodiment, the attenuation device has at least one ferrite ring for this purpose, which ring surrounds the circumference of the external conductor. In particular, multiple ferrite rings may also be arranged one behind the other in the lengthwise direction of the coaxial conductor structure, each encircling the outer circumference of the external conductor (with or without separation from each other). In a further development, the ferrite ring (or at least one of several ferrite rings) is mounted so as to be displaceable on the coaxial conductor structure.

Alternatively or in addition to at least one ferrite ring encircling the external conductor, the surface wave attenuation device may also take the form of an attenuation unit interposed in the course of the coaxial conductor structure, comprising a circuit arrangement (e.g., consisting of capacitive and/or inductive and/or resistive elements). Such a circuit arrangement for attenuating surface waves may in particular have the form of a common mode current filter.

With regard to the variant with ferrite rings and the variant with the interposed (or alternatively appended to the first end of the coaxial conductor structure) circuit arrangement in the form of a common mode current filter, the corresponding prior art from other fields may be used to good effect in both cases. Regarding the meaning of the term "circuit arrangement" in this context, and the options for implementing such a circuit arrangement, reference is made to the earlier explanations relating to the formation of the dipole by a circuit arrangement.

In one embodiment, the surface wave attenuation device comprises an earthing arrangement of the external conductor. Such an earthing arrangement (that is to say galvanic connection to an earth or "electrical mass" terminal) may be provided for example on the outer circumference of the external conductor, e.g., by means of an "earthing cuff" attached to the outer circumference of the external conductor. Such an e earthing cuff may be formed for example separately from several (e.g., two) cuff parts (or halves), which are connected to each other mechanically or electrically (e.g., screwed together) to create the attachment.

In a further development, the antenna device further comprises:
  a second elongated bipolar coaxial conductor structure with an internal conductor and an external conductor that surrounds it coaxially,
  a transmitter/receiver terminal at a first end of the second coaxial conductor structure which is formed by a terminal contact on the internal conductor and a terminal contact on the external conductor to connect a transmitter and/or a receiver for a signal to be transmitted with the antenna device and/or a signal to be received by the antenna device,
  on a second end of the second coaxial conductor structure, a signal-crossing coupling with the first end of the coaxial conductor structure, via which the internal conductor of the second coaxial conductor structure is coupled with the external conductor of the coaxial conductor structure and the external conductor of the second coaxial conductor structure is coupled with the internal conductor of the coaxial conductor structure.

Regarding the design of the second coaxial conductor structure provided in this further development, all of the details and embodiments explained above for the (first) coaxial conductor structure may also be provided, individually or in combinations thereof. This refers for example to the material, the shape (e.g., cross-section) and the arrangement of the internal conductor and external conductor relative to each other, as well as the capability to provide the second coaxial conductor structure with an insulating material, to construct the second coaxial conductor structure rigidly or flexibly and so on.

In this further development, an antenna transmitted signal is also fed in and an antenna received signal is fed out at the first end of the (first) coaxial conductor structure. However, in a usage situation the transmitter or receiver (or a transmitter/receiver combination) is not connected directly at this point to assure the feed in or feed out. Instead, this terminal is provided at the first end of the second coaxial conductor structure so that the signal to be transmitted or received passes through the second coaxial conductor structure, the first end of which is equipped with the transmitter/receiver terminal for connecting the transmitter and/or receivers, and the second end of which is connected with the first end of the (first) coaxial conductor structure via the "signal-crossing coupling".

In one embodiment, the signal-crossing coupling is created by an electrical connection of a terminal contact on the internal conductor of the second coaxial conductor structure to a terminal contact on the external conductor of the coaxial conductor structure, and an electrical connection of a terminal contact on the external conductor of the second coaxial conductor structure to a terminal contact on the internal conductor of the coaxial conductor structure.

In an embodiment, the signal-crossing coupling is formed by a "quadripole", which is designed as a circuit arrangement on a circuit carrier (e.g., circuit carrier board). Regarding the meaning of the term "circuit arrangement" in this context, and the options for implementing such a circuit arrangement reference is made to the explanations relating to the formation of the dipole by a circuit arrangement provided above.

In the simplest case, the "quadripole" is created by two "crossing" conductors (e.g., conductor paths on a circuit carrier board), i.e. galvanic connections on the one hand between the internal conductor of the second coaxial conductor structure and the external conductor of the coaxial conductor structure and on the other hand between the external conductor of the second coaxial conductor structure and the internal conductor of the coaxial conductor structure.

Alternatively, the quadripole may be created with a transformer, for example, by which a first transformer winding is connected to the internal conductor and external conductor of the coaxial conductor structure and a second transformer winding is connected to the internal conductor and external conductor of the second coaxial conductor structure.

One or more detachable electrical connections, in particular e.g., electrical plug connections may be provided in the antenna device according to the invention. In this way, one or more device components may advantageously also be designed to be connectable (or replaceable) individually, to obtain a modular "antenna construction kit". The antenna device, or at least a part thereof, may then be assemble from individual parts in accordance with the respective installation and operating requirements (e.g., plugged, and screwed as necessary). In this way, the device can be configured flexibly "in situ".

Device components that lend themselves to such a "modular" design particularly include: the coaxial conductor structure, terminating impedance (dipole with supply wires), individual components of the dipole (e.g., circuit arrangement parts such as inductances, capacitors, resistors and modules that involve the use of such), common mode current filter (e.g., transformer), "second coaxial conductor structure" (with or without signal-crossing coupling), signal-crossing coupling. Depending on the component, they may be equipped with one or two (two-sided) detachable electrical terminal devices (e.g., plugged and optionally screwed connectors).

In the following, the invention will be described in greater detail on the basis of exemplary embodiments and with reference to the accompanying drawings. In the drawings:

FIG. 1 shows an antenna device according to an embodiment,

FIG. 2 shows an antenna device according to a further embodiment (physical application of the example of FIG. 1), FIG. 3 shows an antenna device according to a further embodiment (physical application of the example of FIG. 1), FIG. 4 shows an antenna device according to a further embodiment (physical application of the example of FIG. 1), FIG. 5 shows an embodiment for implementation of a terminating impedance of an antenna device, FIG. 6 shows a further embodiment for implementation of a terminating impedance of an antenna device, FIG. 7 shows a further embodiment for implementation of a terminating impedance of an antenna device, FIG. 8 shows a further embodiment for implementation of a terminating impedance of an antenna device, FIG. 9 shows a further embodiment for implementation of a terminating impedance of an antenna device, FIG. 10 is a representation to illustrate the influence of a bipolar wiring arrangement on the value of a terminating impedance, FIG. 11 is a further representation to illustrate the influence of a bipolar wiring arrangement on the value of a terminating impedance, FIG. 12 is a further representation to illustrate the influence of a bipolar wiring arrangement on the value of a terminating impedance, FIG. 13 shows an antenna device according to a further embodiment (physical application of the example of FIG. 1), FIG. 14 is a side view of an exemplary implementation of the embodiment of FIG. 13, FIG. 15 is a top view of the implementation of the embodiment of FIG. 13, FIG. 16 shows an antenna device according to a further embodiment (physical application of the example of FIG. 1), FIG. 17 is a side view of an exemplary implementation of the embodiment of FIG. 16, FIG. 18 is a top view of the implementation of the embodiment of FIG. 16, FIG. 19 shows an antenna device according to a further embodiment with a surface wave attenuation device, FIG. 20 shows an antenna device according to a further embodiment with a transformer and common mode current filter, FIG. 21 shows an antenna device according to a further embodiment, with a signal-crossing coupling between the first and second coaxial conductor structures, FIG. 22 shows an antenna device according to a further embodiment, with a signal-crossing coupling between the first and second coaxial conductor structures, FIG. 23 shows an antenna device according to a further embodiment, with a signal-crossing coupling between the first and second coaxial conductor structures, FIG. 24 shows an antenna device according to a further embodiment, with a transformer and common mode current filter, FIG. 25 shows an antenna device according to a further embodiment, with a transformer and common mode current filter, FIG. 26 shows an example of a coaxial conductor structure "correctly terminated" according the prior art for signal transmission, and FIG. 27 shows an example of the use of a terminating impedance on a coaxial conductor structure according to the invention for comparison with the example of FIG. 26.

FIG. 1 shows an antenna device 10 for short-range applications, in particular RFID and/or wireless energy accumulating applications, comprising an elongated bipolar coaxial conductor structure 12 with an internal conductor 14 and an external conductor 16 which surrounds it coaxially.

In the embodiment shown, internal conductor 14 and external conductor 16 are each made from a flexible metallic structure (in this case e.g., wire mesh or metal foil), wherein internal conductor 14 has a wire-like or cylindrical shape and external conductor 16 has a hollow cylindrical shape, and wherein in order to insulate the two conductors 14, 16 from each other an insulating layer 18 is arranged between them and an insulating sheath 20 arranged radially outside conductors 14, 16.

This, with a design of insulating layer 18 and insulating sheath 20 that is also flexible, e.g., made from a corresponding plastic material, the final result is a flexibly bendable construction of coaxial conductor structure 12.

Coaxial conductor structure 12 thus has a design such as is known from conventional bipolar "coaxial cables". A length K1 of coaxial conductor structure 12 is shown in abbreviated form in FIG. 1. In practice, length K1 may typically be any value in the range from about 0.1 m to about 100 m, for example. Moreover, in FIG. 1 the end sections of conductors 14, 16 are shown protruding relatively far out of the ends of insulating sheath 20 on both sides to render the representation more clearly understandable. In practice, this protrusion of external conductor 16 out of insulating sheath 20 and internal conductor 14 out of insulating layer 18 and external conductor 16 may be substantially smaller or not provided at all. In this context it is only important to ensure electrical contacts of conductors 14, 16 by means of various terminal contacts, which will be discussed in detail in the following.

Antenna device 10 further comprises an antenna signal terminal provided on a first end (left in FIG. 1) which is formed by a terminal contact 22 on internal conductor 14 and a terminal contact 24 on external conductor 16, in order to feed an antenna transmitted signal in and feed an antenna received signal out at this antenna signal terminal 22, 24.

In the example of FIG. 1, antenna signal terminal 22, 24 is connected to a HF (high frequency) transmitter 26, so that a signal to be transmitted with antenna device 10 can be generated by transmitter 26 and fed in at the first end of coaxial conductor structure 12.

With respect to this and also the following embodiments of a transmitter, it is understood that in practical use, a receiver, or preferably a transmitter/receiver combination can also be connected to antenna signal terminal 22, 24.

Antenna device 10 may be used for example to send and/or receive a signal with a carrier frequency of more than 100 MHz. Typically, device 10 can be designed for such frequencies of up to about 12 GHz.

Antenna device 10 further comprises a terminating impedance Zterm provided on a second end (right in FIG. 1) of coaxial conductor structure 12, which is formed by a dipole Z connected to a terminal contact 28 on internal conductor 14 and a terminal contact 30 on external conductor 16.

For the sake of simplicity, the term "terminating impedance" and the reference sign "Zterm" are used in this description for both the corresponding representational device component and the corresponding physical dimension (impedance). The same applies for reference sign "Z", which for the sake of simplicity is used here both for the corresponding representational device component (dipole) and the corresponding physical dimension (impendance or dipole impedance).

In FIG. 1, the left part and the right part are each to be understood as schematic block circuit diagrams.

To this extent, the path of electrical wires 32, 34 (for connecting transmitter 26) and of wires 36, 38 (for connecting dipole Z) are to seen as exemplary or "having the nature of a circuit diagram".

A particular feature of antenna device 10 consists in that
dipole Z comprises at least one capacitor and/or at least one inductance, such that,
when transmitting, a HF alternating current propagating through internal conductor 14 and reaching the second end of coaxial conductor structure 12 is coupled with the outside of external conductor 16 at the second end of coaxial conductor structure 12 by means of terminating impedance Zterm to generate a HF alternating current that originates from the second end of coaxial conductor structure 12 and propagates via external conductor 16 on the outside of external conductor 16, and
when receiving, a HF alternating current propagating through external conductor 16, flowing on the outside of external conductor 16 and reaching the second end of coaxial conductor structure 12 is coupled with internal conductor 14 at the second end of coaxial conductor structure 12 by means of terminating impedance Zterm to generate a HF alternating current that originates from the second end of coaxial conductor structure 12 and propagates via internal conductor 14.

Dipole Z (and its "equivalent circuit diagram") preferably comprises at least one capacitor and at least one inductance. If dipole Z also comprises one or more ohmic resistors, it is preferably provided for of these resistors that the resistance value is less than 0.5 or more than 2 times the "wave resistance" of coaxial conductor structure 12. In an advantageous embodiment, terminating impedance Zterm has at least approximately the same value as this wave resistance of coaxial conductor structure 12.

Given the relatively high frequencies of the HF alternating currents and "travelling waves" encountered in a use situation, it is usual in practice that terminating impedance Zterm is not defined solely by the dipole impedance Z (i.e. Zterm=Z), but the bipolar wiring arrangement 36, 38 causes not inconsiderable impedance or impedances itself, and these accordingly combine with dipole impedance Z to determine the value of terminating impedance Zterm.

In the following description of further embodiments, the same reference numbers will be used for equivalent components, with a small letter in each case to differentiate between embodiments. In this context, essentially only the differences from the embodiments already described will be discussed, and otherwise the reader is herewith referred explicitly to the descriptions of previous embodiments.

FIG. 2 shows an advantageous embodiment of dipole Z within the scope of the invention with (at least) one inductance L and (at least) two capacitors C.

FIG. 3 shows an advantageous embodiment of dipole Z within the scope of the invention with (at least) three inductances L and (at least) four capacitors C.

Figure 4:
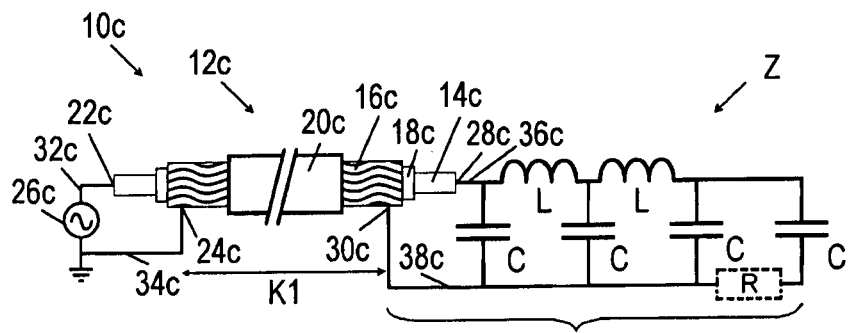

FIG. 4 shows an advantageous embodiment of dipole Z within the scope of the invention with (at least) two inductances L and (at least) four capacitors C. FIG. 4 further illustrates the option within the scope of the invention to provide at least one ohmic resistor R (in FIG. 4 indicated by dashed line) in the circuit of dipole Z, wherein it is particularly advantageous for avoiding electrical losses if this or every such resistor R is significantly smaller or significantly larger than the wave resistance of the coaxial conductor structure $12c$ in question.

Figure 1:
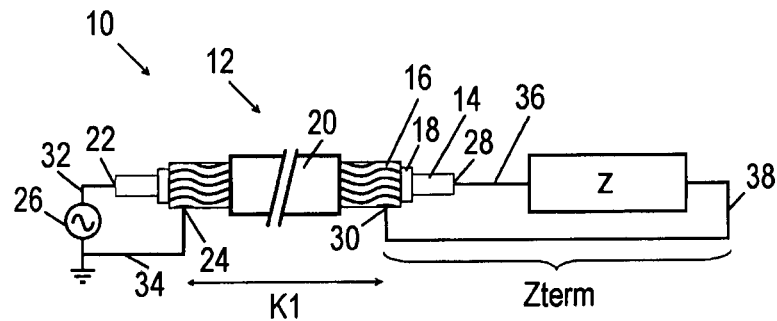
Figure 2:
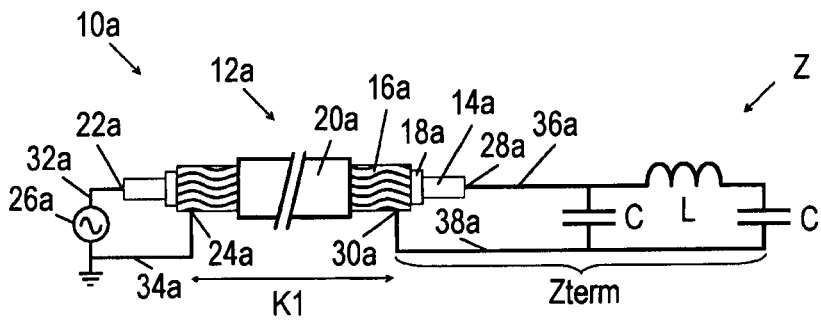
FIGS. 2 to 4 shows several exemplary embodiments of antenna devices 10a, 10b and 10c, which in this respect may be considered as physical implementations of the example of FIG. 1, since each of these examples in FIGS. 2 to 4 represent a circuit diagram (or equivalent circuit diagram) of an actual physical design of dipole Z.
Figure 3:
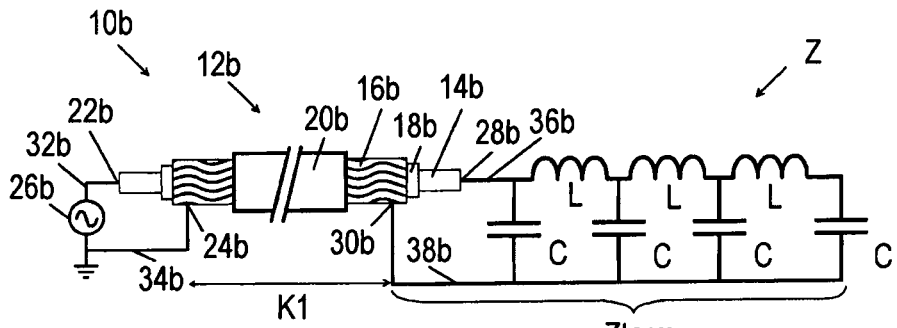

A further advantageous feature of all of the examples according to FIGS. 2 to 4 within the scope of the invention consists in that the ends of conductors $36a$, $36b$ and $36c$ and $38a$, $38b$ and $38c$ ending at dipole Z are connected to each other via a capacitor C inside dipole Z, wherein preferably the conductor in question ($36a$, $36b$ and $36c$ and/or $38a$, $38b$ and $38c$) is extended from (at least) one of the corresponding connection points on this capacitor C via an inductance L (in an extension of the conductor in question).

Although dipole Z as represented in each of FIGS. 2 to 4 is to be understood primarily in the form of a circuit diagram, the capacitors C, inductances L and resistor R represented in these figures can actually be realised as corresponding "components" (e.g., capacitors, coils, resistors) with corresponding conductor connections between said components. Such conductor connections may be realised as conductor paths on a circuit carrier such as a circuit carrier board for example, wherein the same circuit carrier also supports said components. Alternatively or additionally, however, the elements C, L and R shown in the circuit diagrams may also be realised in the form of a circuit arrangement on a circuit carrier, particularly a circuit carrier board for example, by a corresponding geometrical shape and a mutual arrangement of electrically conductive yet mutually insulated areas (e.g., conductor paths, conductive areas, through-connections etc.). Such conductive areas on or in a circuit carrier may also be provided for implementation of at least sections of the supply conductors $36a$, $36b$ and $36c$ and $38a$, $38b$ and $38c$.

Figure 5:
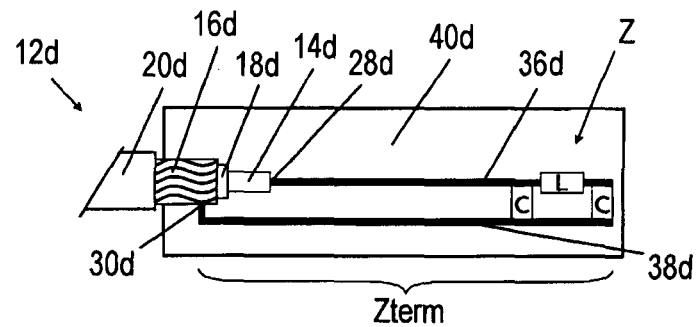

FIG. 5 shows for example an embodiment of an realisation of a terminating impedance Zterm as a circuit arrangement on a circuit carrier board $40d$. In this case, conductors $36d$, $38d$ are represented wholly or in part by corresponding conductor paths of the components provided on one side in this example for realising the represented inductance L and the represented capacitors C. Optionally, short cable segments soldered both ends may be provided between the conductor paths and terminal contacts $28d$, $30d$. Alternatively, at least one of terminal contacts $28d$, $30d$ may also be conformed directly on the conductor path in question (conductor $36d$ and/or conductor $38d$) as a solder point.

In contrast to FIG. 5, terminal contacts $28d$, $30d$ might also have the form of a detachable connection rather than as solder points. For example, circuit carrier board $40d$ might be connectable to coaxial conductor structure $12d$ e.g., via a suitable connecting device (e.g., coaxial plug connection). If coaxial conductor structure $12d$ is formed by a conventional coaxial cable already equipped with a coaxial connector, a suitable mating connector may be provided for this on the circuit carrier board $40d$.

The implementation example according to FIG. 5 is evidently suitable for realising an antenna device such as was described previously with reference to FIG. 2.

If, as shown in FIG. 5, relatively long conductors $36d$, $38d$ are provided to connect coaxial conductor structure $12d$ to dipole Z, given the high signal frequencies it is possible to achieve the effect of a respective inductance for conductors $36d$ and $38d$ selectively. Of course, such "feed wires" $36d$, $38d$ may also be considerably shorter, differing from the representation in FIG. 5.

Figure 6:
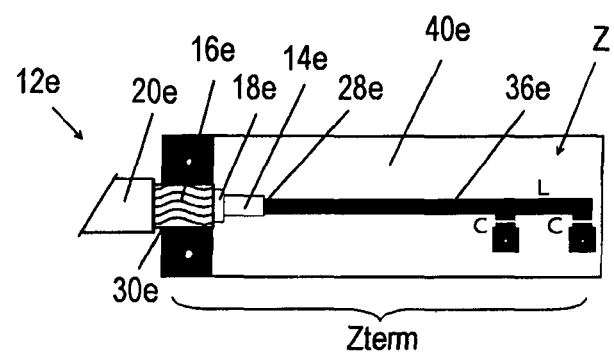

FIG. 6 shows an embodiment for implementation of a terminating impedance Zterm that differs from FIG. 5 in two respects. Unlike the example of FIG. 5, in the example of FIG. 6 inductance L and capacitors C are not in the form of corresponding components, but rather a geometric shape equivalent to such components and an arrangement of conductor paths on a circuit carrier board $40e$. Moreover, in the example according to FIG. 6, both sides of circuit carrier board $40e$ are used. While the conductor $36a$ from terminal contact $28e$ to dipole Z passes on the flat upper side of circuit carrier board $40e$ visible in FIG. 6, the other conductor has the form of a (full-surface in this case) electrical coating on the lower (unseen) flat side in FIG. 6. The white dots in FIG. 6 represent through-connections, via which the terminal contact arrange on the upper side and the respective lower terminals of capacitors C in FIG. 6 are connected electrically to the underside of circuit carrier board $40e$.

Figure 7:
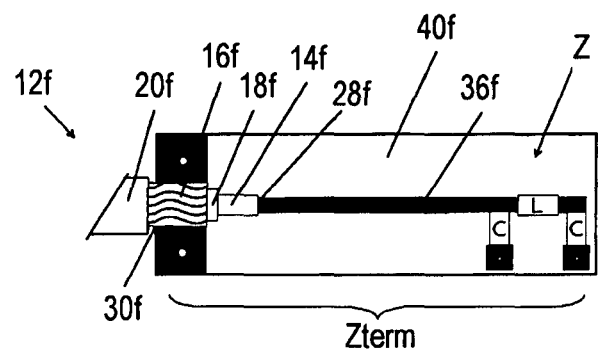

FIG. 7 shows a further embodiment for implementing a terminating impedance Zterm, in which details from the examples of FIGS. 5 and 6 are combined. Thus, in the example of FIG. 7 discrete components are also arranged on the upper side of a circuit carrier board $40f$ to implement an inductance L and capacitors C. At the same time, in the example of FIG. 7 the implementation of the two conductors between the second end of coaxial conductor structure $12f$ and dipole Z is provided, as in the example of FIG. 6. Unlike that example, other combinations of L and C are conceivable, and may be designed to take account of the required bandwidth and operating frequency.

Figure 8:
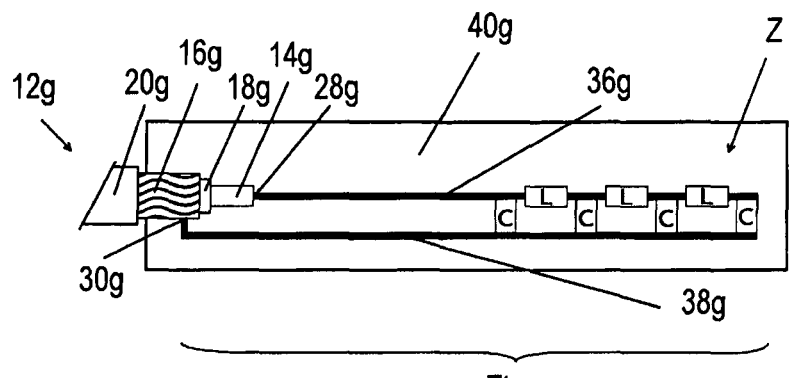
Figure 9:
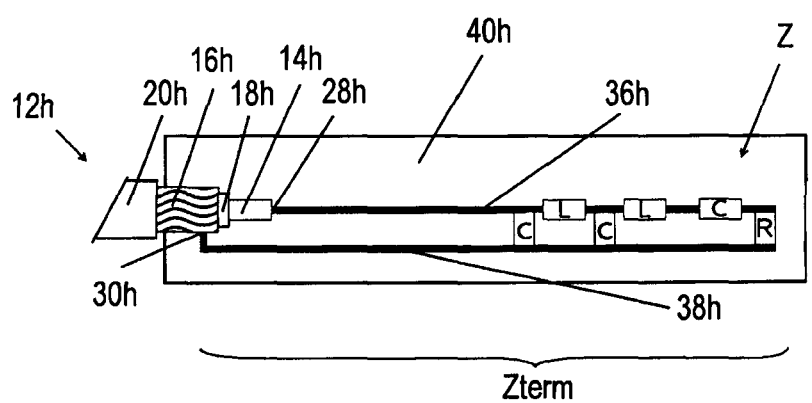

FIGS. 8 and 9 each show one further embodiment for the implementation of a terminating impedance Zterm, which corresponds substantially to the example of FIG. 5, but wherein the number and arrangement of each of the inductances L and capacitors C is varied. In addition, in the example of FIG. 9 as shown, an ohmic resistor R is provided in the circuit arrangement that forms dipole Z.

Figure 10:
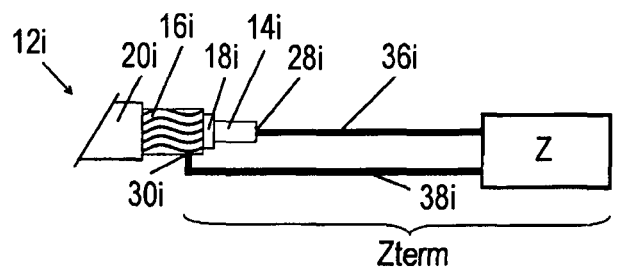
Figure 11:
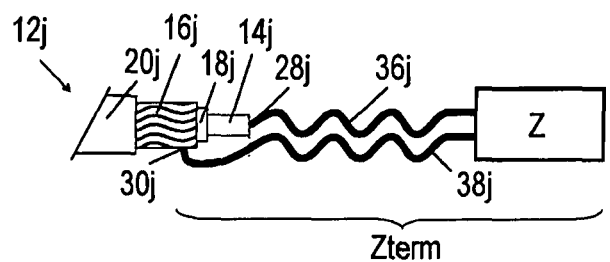
Figure 12:
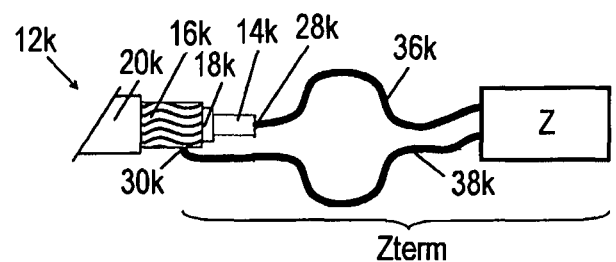

FIGS. 10 to 12 again illustrate the fact that the value of terminating impedance Zterm may differ more or less from the impedance value of dipole Z depending on the design of feed supply conductors $36i$, $38i$ and $36j$, $38j$ and $36k$, $38k$. FIGS. 10 to 12 each show examples of different paths of conductors $36i$, $36j$, and $36k$ and $38i$, $38j$ and $38k$. If the value of terminating impedance Zterm is to be dimensioned in a certain way (e.g., at least approximately corresponding to a wave resistance of coaxial conductor structure $12i$, $12j$ or $12k$), the influence of the two conductors $36i$, $38i$ and $36j$, $38j$ and $36k$, $38k$ on the value obtained for terminating impedance Zterm should therefore be taken into account.

Figure 13:
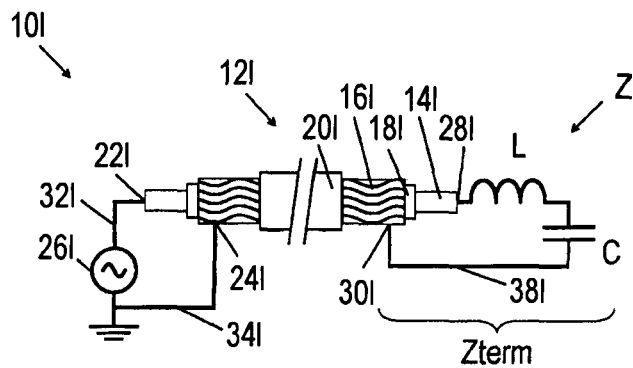

FIG. 13 shows an antenna device 10 according to a further embodiment, similar to the examples of FIGS. 2 to 4. Unlike those examples, the example FIG. 13 provides a simplified circuit arrangement for creating dipole Z. This circuit arrangement consists of a serial circuit, an inductance L and a capacitor C.

Figure 14:
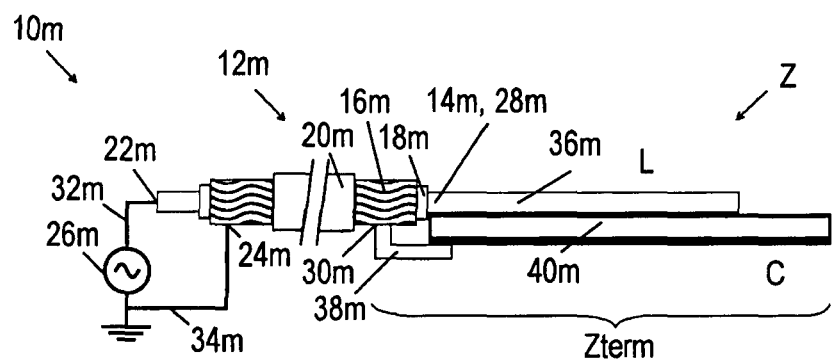
Figure 15:
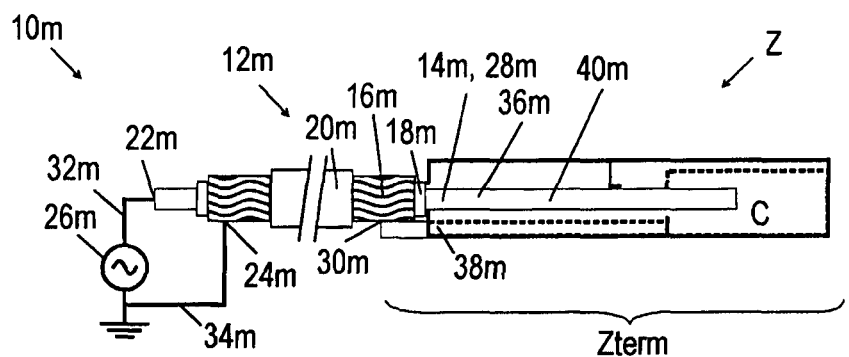

FIG. 14 (side view) and FIG. 15 (top view) show physical realisations of the terminating impedance Zterm represented in the form of a circuit diagram in FIG. 13.

As FIGS. 14 and 15 show, dipole Z is again formed by a circuit arrangement on a circuit carrier board 40*m*. A conductor 36*m* arranged on the top side (uppermost in FIG. 14) forms inductance L by virtue of its corresponding length. A distal end section of conductor 36*m* together with an electrically conductive coating on the underside of circuit carrier board 40*m* (and the material of circuit carrier board 40*m* as the dielectric) sketched in dashed lines on the right in FIG. 15 forms capacitor C. This (e.g., metallic) coating on the underside continues to form conductor 38*m*, as is also shown by dashed lines shown FIG. 15.

FIGS. 14 and 15 also reveal an implementation detail that is generally advantageous for the invention, consisting in that is to say that internal conductor 14*m* as a single part (and e.g., straight) is permitted to protrude as an "internal conductor extension" from coaxial conductor structure 12*m* (and from the end of external conductor 16*m*), at the second end of coaxial conductor structure 12*m*, so that both the terminal contact in the other variants (see for example 28*l* in FIG. 13) provided here and conductor 36*m* can be implemented simply (wherein conductor 36*l* in the example of FIGS. 14 and 15 again implements even simultaneously an inductance L).

Figure 16:
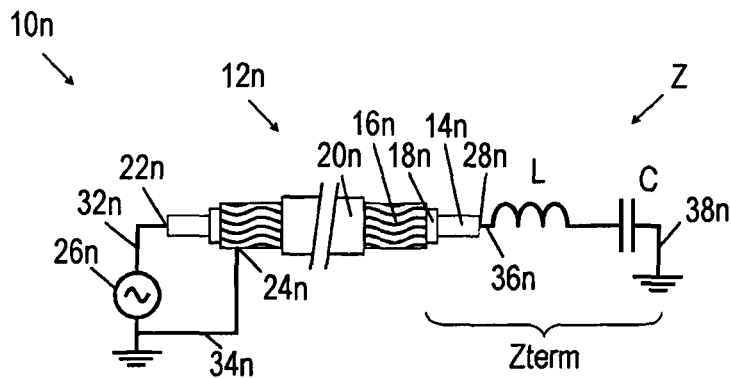

FIG. 16 shows an antenna device 10*n* according to a further embodiment which corresponds substantially to the example of FIG. 13. Unlike the example of FIG. 13 and the other embodiments described previously, in the example of FIG. 16 dipole Z is connected directly (at the second end of coaxial conductor structure 12*n*) and "via the short path" only to one conductor (in this case: conductor 36*n*), while a second conductor 38*n* originating from dipole Z is connected directly to an earthing arrangement contact (electrical mass, e.g., a metal device housing or the like). As is evident in FIG. 16, a terminal of a transmitters 26*n* is also connected both to an earthing arrangement contact and to a terminal contact 24*n* on external conductor 16*n*. To this extent, one might also say that the second conductor 38*n* originating from dipole Z is connected to external conductor 16*n* (on terminal contact 24*n*) via the earthing arrangement (electrical mass) and further at the first end of coaxial conductor structure 12*n*.

Figure 17:
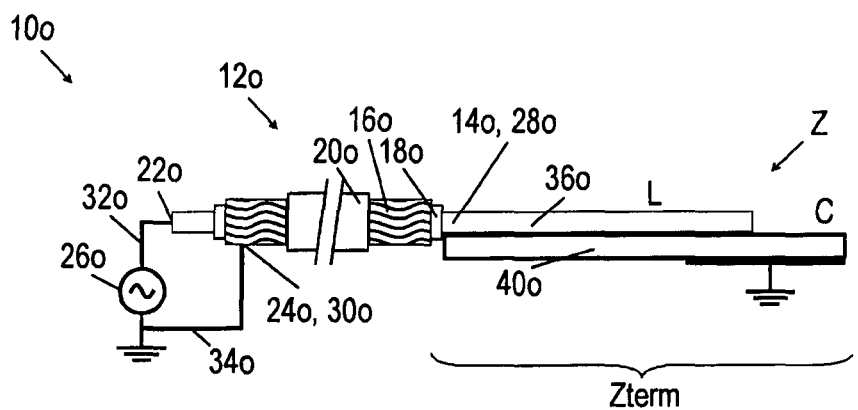
Figure 18:
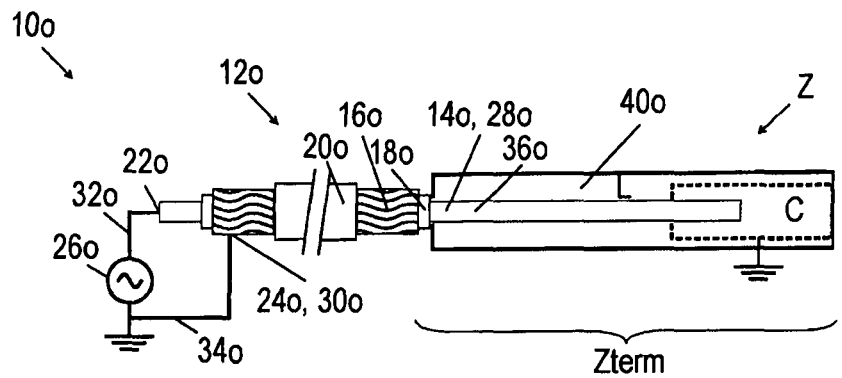

FIG. 17 (side view) and FIG. 18 (top view) show a physical implementation of the embodiment represented in the form of a circuit diagram in FIG. 16.

As is evident from FIGS. 17 and 18, the conductor 36*o* arranged on the upper side of a circuit carrier board 40*o* forms inductance L by virtue of its corresponding length. A distal end of conductor 36*o* together with an electrically conductive (e.g. metal) coating on the underside of circuit carrier board 40*o* (and with the material of circuit carrier board 40*o* as the dielectric) forms capacitor C.

Unlike the example of FIGS. 14 and 15, however, in the example of FIGS. 17 and 18 the coating area of circuit carrier board 40*o* that forms the "lower capacitor board" is not routed via a corresponding conductor path to the second end of coaxial conductor structure 12*o*, but instead is connected directly to a grounding contact (electrical mass).

Figure 19:
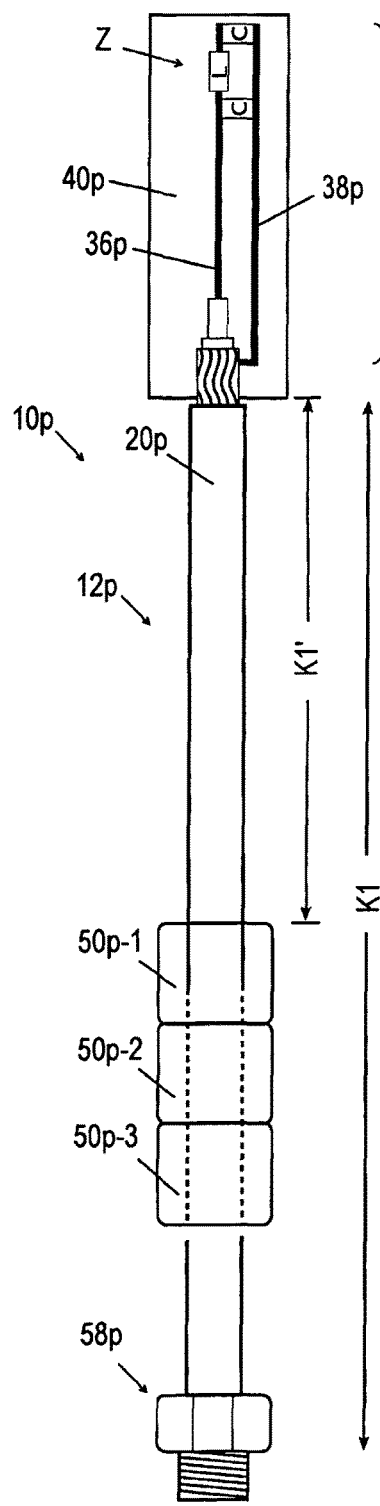

FIG. 19 shows and antenna device 10*p* according to a further embodiment, in which a terminating impedance Zterm according to the example of FIG. 5 is implemented. A special feature of antenna device 10*p* consists in that when viewed in the lengthwise direction of a coaxial conductor structure 12*p* a surface wave attenuation device is arranged at a distance from the second end of coaxial conductor structure 12*p*. In the example shown, this takes the form of a plurality (here three) ferrite rings 50*p*-1, 50*p*-2 and 50*p*-3 arranged longitudinally one behind the other. The signal to be transmitted or received is fed in or out respectively at an antenna signal terminal 58*p* (here: bipolar threaded connector).

The arrangement of ferrite rings 50*p*-1 to 50*p*-3 is advantageous in that for example when transmitting the area of the "returning travelling waves" returning from the second end of the coaxial conductor structure 12*p* can be well defined along coaxial conductor structure 12*p*. Such ferrite rings serve to absorb a substantial amount of the energy of incoming returning travelling waves in known manner.

In FIG. 19, besides the actual length K1 of coaxial conductor structure 12*p*, an "active" or "effective" length K1' of this coaxial conductor structure 12*p* is also indicated. Travelling waves can propagate in this "active section".

In one embodiment, multiple ferrite rings, e.g., the ferrite rings 50*p*-1 to 50*p*-3 shown in FIG. 19 are arranged in fixed positions along length K1 (with or without mutual separation). Alternatively, individual or all of the multiple ferrite rings may be provided so as to be displaceable along the coaxial conductor structure (to enable the properties of the antenna device to be adjusted). In addition, the antenna impedance of the device according to the invention can be further influenced advantageously and/or set to a desired range using ferrite rings on the coaxial conductor structure such as the ferrite rings 50*p*-1 to 50*p*-3 described in the example of FIG. 19.

Figure 20:
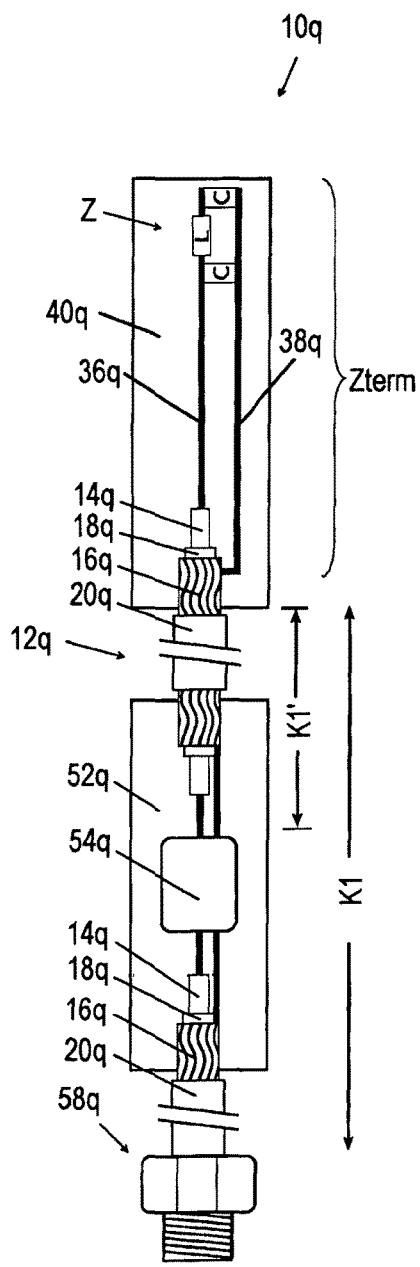

FIG. 20 shows a further embodiment of an antenna device 10*q*, the structure and function of which corresponds substantially to the example of FIG. 19. Unlike the example of FIG. 19, instead of the ferrite rings, in the example of FIG. 20 just a single transformer 54*q* integrated in a coaxial conductor structure 12*q* is provided on a circuit carrier board 52*q*, and this is enough to realise a "common mode current filter" here (and at the same time provide the effect of a "surface wave attenuation device"). Transformer 54*q* may be provided for example as a component with which circuit carrier board 52*q* is assembled, wherein the electrical terminal of transformer 54*q* is realised with conductor paths that are connected to internal conductor 14*q* and external conductor 16*q* of coaxial conductor structure 12*q* via corresponding terminal contacts. In this example, coaxial conductor structure 12*q* is separated at one point to a certain degree, and again assembled via the circuit arrangement (here: transformer 54*q*) formed by circuit carrier board 52*q*.

Unlike the representation of FIG. 20, the circuit carrier board 52*q* assembled with transformer 54*q* may also be integrated e.g. as a replaceable unit (e.g., pluggable and/or screwable).

As is shown, the total length K1 of coaxial conductor structure 12*q* is divided up again, on the one hand into an active (carrying travelling waves) section with length K1' and on the other hand a remaining section which only serves to guide signals (e.g., from a transmitter or to a receiver).

Figure 21:
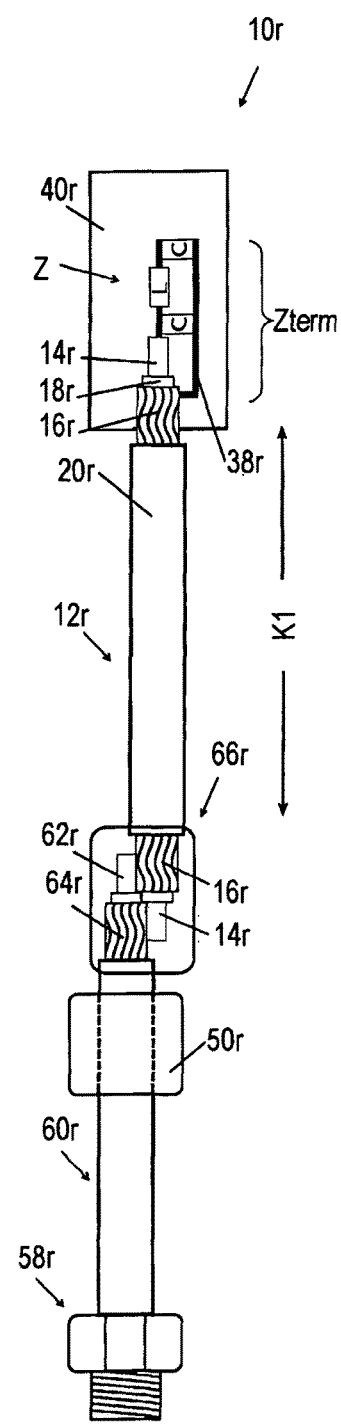

FIG. 21 shows a further embodiment of an antenna device 10*r* with a construction similar to that of the examples of FIGS. 2, 5 and 19, but differing therefrom in that a further development of antenna device 10*r* further comprises:

a second elongated bipolar coaxial conductor structure 60*r* with an internal conductor 62*r* and an external conductor 64*r* that surrounds it coaxially, a transmitter/receiver terminal 58*r* at a first end (left in FIG. 21) of the second coaxial conductor structure 60*r*, which is formed by a terminal contact on internal conductor 62*r* and a terminal contact on external conductor 64*r* to connect a transmitter and/or a receiver (not shown in FIG. 21) for a signal to be transmitted with the antenna device and/or a signal to be received by the antenna device 10r, on a second end (in the middle of FIG. 21) of the second coaxial conductor structure 60r, a signal-crossing coupling 66r with the first end of coaxial conductor structure 12r, via which internal conductor 62r of the second coaxial conductor structure 60r is coupled with the external conductor 16r of the coaxial conductor structure 12r and the external conductor 64r of the second coaxial conductor structure 60r is coupled with the internal conductor 14r of the coaxial conductor structure 12r. Galvanic connections are preferably provided between the conductors concerned as couplings.

In this further development according to FIG. 21, an antenna transmitted signal is not fed in and an antenna received signal is not fed out (via a connected transmitter or receiver) directly at the first end of the coaxial conductor structure 12r, but via the additionally provided second coaxial conductor structure 60r which is connected via signal-crossing coupling 66r.

In this example, the electrical connections between internal conductor 62r and external conductor 16r as well as external conductor 64r and internal conductor 14r are realised as corresponding solder points. An electrical plug connection (here with crossed contacts) is also possible as an alternative to such solder points. In this case, signal-crossing coupling 66r may then advantageously be installed as a "module" for assembling the antenna device.

Figure 22:
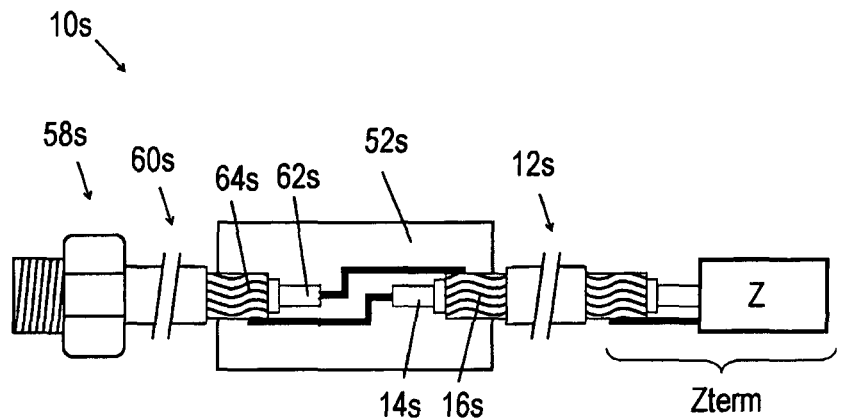

FIG. 22 shows an antenna device 10s according to a further embodiment, in which, as in the example of FIG. 21, a second coaxial conductor structure 60s is provided, and is connected to coaxial conductor structure 12s via a signal-crossing coupling. As is represented, the signal-crossing coupling is again created by connecting internal conductor 62s galvanically with external conductor 16s and external conductor 64s galvanically with internal conductor 14s. Unlike the example of FIG. 21, however, for this connection a circuit carrier board 52s is used on which these galvanic connections are routed as conductor paths, and the corresponding internal conductors and external conductors are incorporated by solder points, for example.

Figure 23:
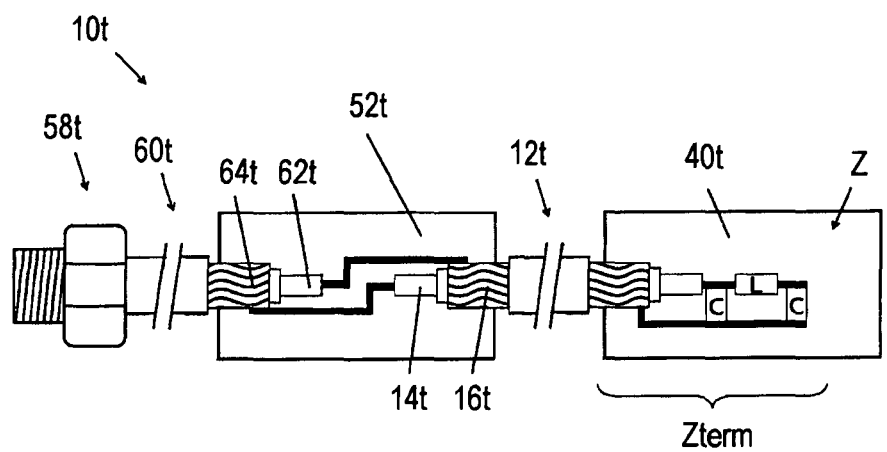

FIG. 23 shows an antenna device 10t according to a further embodiment, similar to the example of FIG. 22. The example of FIG. 23 may be considered a physical realisation of the example of FIG. 22 to the extent that the terminating impedance Zterm on antenna device 10t is represented more physically with respect to its implementation (in fact corresponding approximately to the example of FIG. 5).

Figure 24:
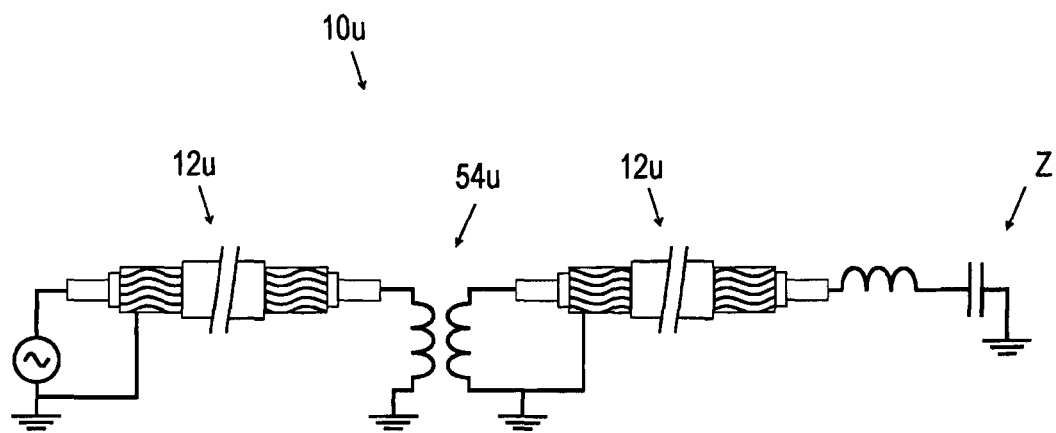
Figure 25:
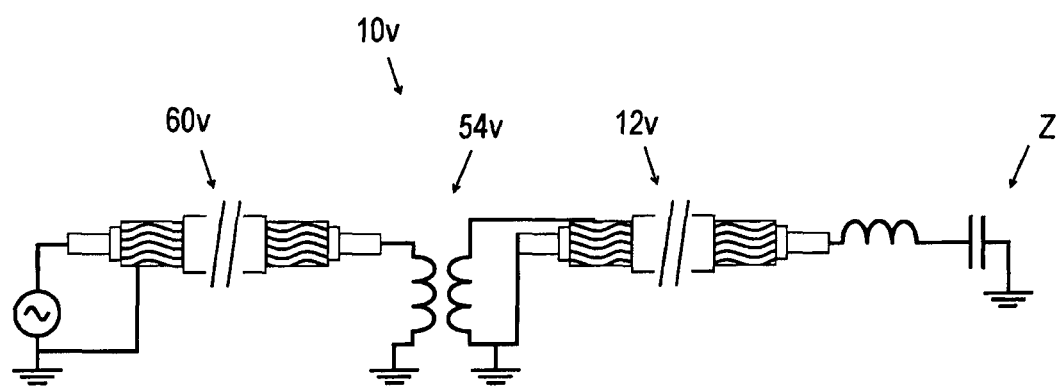

FIGS. 24 and 25 show antenna devices 10u and 10v representing two further embodiments, each of which is constructed similarly to the example of FIG. 16. They differ from the example of FIG. 16 in that (like the example of FIG. 20) again a transformer 54u and 54v is integrated in each, and has the effect of a common mode current filter and surface wave attenuation device. Transformer 54u and 54v may each be incorporated as a replaceable unit or module for example (e.g., pluggable and/or screwable).

The examples according to FIGS. 24 and 25 differ in the "polarity" of the transformer windings, on the right in the figures. Whereas FIG. 24 represents a "non-signal crossing" coupling between two sections of a coaxial conductor structure 12u, in FIG. 25 a "signal-crossing coupling" is created between a coaxial conductor structure 12v and a second coaxial conductor structure 60v.

In summary, with the present invention it is possible to create an advantageous coaxial travelling wave conductor for transmitting information and energy. In order to create an "active antenna area", particularly e.g. flexible coaxial structures known from the prior art can be used to good effect, although unlike the prior art this coaxial conductor structure is used not just for simple signal transmission, its functionality is also extended and "repurposed" due to its termination with a suitable terminating impedance. The terminating impedance is advantageously able to provide the signal couplings necessary for both transmitting and receiving with very low electrical losses. Particularly when formed by a network of inductances and/or capacitors (and/or relatively small or relatively large ohmic resistors) the signal to be transmitted or received is not significantly attenuated in the area of the terminating impedance. The operating principle of the antenna device is based on the fact that a non-compensated (common mode) signal is carried as the surface or outer shell wave on the outside of the external conductor of the coaxial conductor structure.

Figure 26:
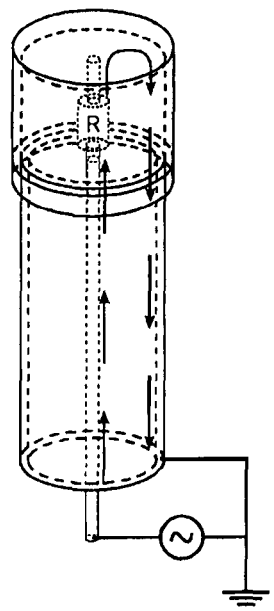
Figure 27:
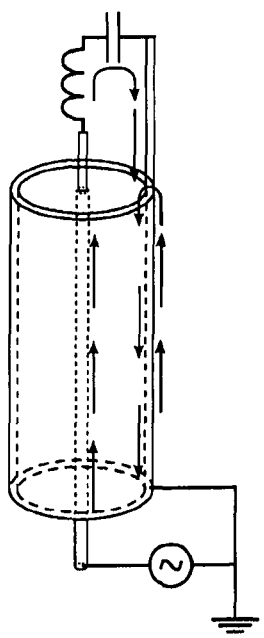

Finally, with reference to FIGS. 26 and 27, the basic idea of the invention should be illustrated again using a comparison example.

FIG. 26 shows an example of a conventional coaxial conductor structure for signal transmission. At a first end, at the bottom in FIG. 26, a HF signal of a transmitter is fed into the internal conductor. At this first end, the external conductor is connected to mass/earth. This connected is only represented for exemplary purposes, so the correct reproduction of a e.g. standard coaxial plug connector has not been used here.

At a second end, at top in FIG. 26, a terminal resistor R is connected "correctly" (resistor R is typically chosen according to the wave resistance of the coaxial conductor structure, often e.g., a 50Ω resistor). The coaxial structure is continued at this second end, and the external conductor is not interrupted at any point (galvanic connection). In this way, the shielding effect is obtained via the terminal end (second end); the external conductor functions like a Faraday cage.

The arrows in FIG. 26 symbolise a snapshot of a HF alternating current propagating via the internal conductor. Because of the current in the internal conductor, the current overlaid on the external conductor is evenly balanced, but is flowing in exactly the opposite direction. Because of the skin effect, this "backflow" only penetrates the external conductor to a minimal depth, and cannot escape to the outside because of the closed metal shield.

For comparison purposes, FIG. 27 shows an example of a similarly constructed and supplied coaxial conductor structure, the terminal of which has been modified at the second end according the concept of the invention.

In the example of FIG. 27 a dipolar conductor structure instead of the coaxial terminal resistor R is connected directly to the outer and internal conductors, something which is to be avoided under all circumstances according to the prior art (cf. FIG. 26). The opening of the outer conductor causes an additional path along the outside of the external conductor to open for the overlaid backflow current on the inside of the external conductor. The skin effect now allows both currents to flow without completely flooding the external conductor.

As is shown clearly in FIG. 27, this coupling effectively corresponds to a "diversion" to the outside, with "deflection of the flow direction by 180°. Surprisingly, the "outside current" is now in phase with the original "signal current" in the internal conductor. It is as if this current were connected directly to the outside of the external conductor. Since the two currents are in phase, this may be described as a common mode coupling. In this context, a preferred objective within the scope of the invention is firstly to create a termination with as little loss as possible (at the second end) and secondly, given such a termination, to maximise the current flow on the outside of the external conductor, so that ideally besides phase synchronisation approximate equilibrium also prevails on the out-side of the external conductor.

The "diverted" HF alternating current on the outside of the external conductor propagates along the coaxial conductor structure as a surface or external wave and generates an electromagnetic field around the external conductor, which can be used for example for wireless communication and/or energy transmission.

Since the (preferably low-loss or lossless) terminating impedance is constant in practice, the impedance of the "near-field antenna" created in this way is almost constant under practically all conditions and enables installation and operation in any geometry/environment. Curvatures in the path of the coaxial conductor structure, preferably relatively small curvatures, are beneficial for wave taking off and thus increase the range of the antenna.

This approach, on which the invention is based, stands in extreme contrast to the prior art. The astonishing, uncomplicated, diverse properties of such a near-field antenna were hiterto unknown. Thus for example, an antenna according to the invention may be routed for example in serpentine pattern on the floor in a charging station to charge the electrical energy accumulator in a car parked on top of it (capacitive charging of e.g., a rechargeable battery in the vehicle). Compared with inductive charging systems this offers enormous advantages, since no coils have to be positioned precisely next to one another. In most cases it is enough for the vehicle to come to a standstill "anyhow" over the antenna. It can be used to "energize" expansive carriageway areas or entire car parking surfaces for example.

The invention claimed is:

1. A traveling wave short-range antenna device, comprising:
    a first elongated bipolar coaxial conductor structure with a first internal conductor and a first external conductor which surrounds the first internal conductor coaxially,
    an antenna signal terminal at a first end of the first coaxial conductor structure, the antenna signal terminal comprising a first terminal contact on the first internal conductor and a second terminal contact on the first external conductor, the antenna signal terminal being configured to feed in an antenna transmitted signal and feed out an antenna received signal,
    a terminating impedance at a second end of the first coaxial conductor structure, the terminating impedance comprising a dipole connected to the first internal conductor at a first terminal contact and to the first external conductor at a second terminal contact, wherein the dipole comprises at least one capacitor and/or at least one inductance, such that,
    when transmitting the antenna transmitted signal, the terminating impedance is configured to couple a HF alternating current propagating through the first internal conductor and reaching the second end of the first coaxial conductor structure to the outside of the first external conductor at the second end of the first coaxial conductor structure, thereby generating a HF alternating current creating an electromagnetic travelling wave bound to the first coaxial conductor structure that originates from the second end of the first coaxial conductor structure and propagates via the first external conductor on the outside of the first external conductor, and that
    when receiving the antenna received signal, the terminating impedance is configured to couple a HF alternating current propagating through the first external conductor, flowing on the outside of the first external conductor and reaching the second end of the first coaxial conductor structure with the first internal conductor at the second end of the first coaxial conductor structure, thereby generating a HF alternating current that originates from the second end of the first coaxial conductor structure and propagates via the first internal conductor,
    wherein more than 50% of energy from an antenna transmission signal arriving at the second end of the first coaxial conductor structure travels back to the first end of the first coaxial conductor structure as said travelling wave, the antenna transmission signal being generated by the infeed of the antenna transmitted signal at the first end of the first coaxial conductor structure, and/or
    wherein more than 40% of energy of the infed antenna transmitted signal travels back towards the first end of the first coaxial conductor structure as said travelling wave.

2. The antenna device according to claim 1, wherein the dipole comprises at least one capacitor and at least one inductance.

3. The antenna device according to claim 1, wherein the dipole further comprises at least one ohmic resistor, wherein a resistance value of this ohmic resistor is less than 0.5 times the size, or more than 5 times the size of a wave resistance of the first coaxial conductor structure.

4. The antenna device according to claim 1, wherein the terminating impedance is at least approximately equal to a wave resistance of the first coaxial conductor structure.

5. The antenna device according to claim 1, wherein the dipole is formed by a circuit arrangement on a circuit carrier.

6. The antenna device according to claim 1, wherein a common mode current filter or a surface wave attenuation device is arranged at a distance from the second end of the first coaxial conductor structure when viewed in a lengthwise direction of the first coaxial conductor structure.

7. The antenna device according to claim 1, wherein the first coaxial conductor structure is flexibly bendable.

8. The antenna device according to claim 1, further comprising:
    a second elongated bipolar coaxial conductor structure with a second internal conductor and a second external conductor surrounding the second internal conductor coaxially,
    a transmitter/receiver terminal at a first end of the second coaxial conductor structure, the transmitter/receiver terminal comprising a third terminal contact on the second internal conductor and a fourth terminal contact on the second external conductor to connect a transmitter and/or a receiver for the antenna transmitted signal transmitted with the antenna device and the antenna received signal received by the antenna device, respectively,
    at a second end of the second coaxial conductor structure, a signal-crossing coupling with the first end of the first coaxial conductor structure, via which the second internal conductor of the second coaxial conductor structure is coupled with the first external conductor of the first coaxial conductor structure and the second external conductor of the second coaxial conductor structure is coupled with the first internal conductor of the first coaxial conductor structure.

9. The antenna device according to claim 8, wherein the signal-crossing coupling is formed a by an electrical connection of the third terminal contact on the second internal conductor of the second coaxial conductor structure with the second terminal contact on the first external conductor of the first coaxial conductor structure and an electrical connection of the fourth terminal contact on the second external conductor of the second coaxial conductor structure with the first terminal contact on the first internal conductor of the first coaxial conductor structure.

10. The antenna device according to claim 8, wherein the signal-crossing coupling is a quadripole, which has the form of a circuit arrangement on a circuit carrier.

11. A method of using the antenna device according to claim 1 for short-range applications.

12. The method according to claim 11, further comprising transmitting and receiving a signal with a carrier frequency of more than 100 MHz, and/or less than 12 GHz.

13. The method of claim 11, said short range applications comprising RFID or energy accumulator charging applications.

14. The method of claim 12, said carrier frequency being more than 400 MHz and/or less than 5 GHz.

15. The method of claim 3, said resistance value of said ohmic resistor being less than 0.2 times the size, or more than 10 times the size, of said wave resistance.

16. The antenna device according to claim 1, wherein more than 50% of energy from an antenna transmission signal arriving at the second end of the first coaxial conductor structure travels back to the first end of the first coaxial conductor structure as said travelling wave, the antenna transmission signal being generated by the infeed of the antenna transmitted signal at the first end of the first coaxial conductor structure.

17. The antenna device according to claim 1, wherein more than 40% of energy of the infed antenna transmitted signal travels back towards the first end of the first coaxial conductor structure as said travelling wave.

* * * * *